(12) United States Patent
Min

(10) Patent No.: US 9,643,384 B2
(45) Date of Patent: May 9, 2017

(54) DISPLAY DEVICE

(71) Applicant: Samsung Display Co., Ltd., Yongin (KR)

(72) Inventor: Gui-Nam Min, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 6 days.

(21) Appl. No.: 14/266,259

(22) Filed: Apr. 30, 2014

(65) Prior Publication Data

US 2015/0017417 A1    Jan. 15, 2015

(30) Foreign Application Priority Data

Jul. 11, 2013    (KR) .................. 10-2013-0081724

(51) Int. Cl.
| | |
|---|---|
| *B32B 7/12* | (2006.01) |
| *C09J 7/04* | (2006.01) |
| *B32B 5/02* | (2006.01) |
| *B32B 19/04* | (2006.01) |
| *B32B 19/08* | (2006.01) |

(Continued)

(52) U.S. Cl.
CPC ............... *B32B 7/12* (2013.01); *B32B 5/024* (2013.01); *B32B 19/045* (2013.01); *B32B 19/08* (2013.01); *B32B 27/12* (2013.01); *B32B 27/281* (2013.01); *B32B 27/283* (2013.01); *B32B 27/308* (2013.01); *B32B 27/38* (2013.01); *B32B 27/40* (2013.01); *C09J 7/04* (2013.01); *B32B 2250/03* (2013.01); *B32B 2250/40* (2013.01); *B32B 2262/0269* (2013.01); *B32B 2262/0276* (2013.01); *B32B 2262/101* (2013.01); *B32B 2262/105* (2013.01); *B32B 2262/106* (2013.01); *B32B 2307/412* (2013.01); *B32B 2307/418* (2013.01); *B32B 2307/54* (2013.01); *B32B 2307/542* (2013.01); *B32B 2457/20* (2013.01); *B32B 2457/202* (2013.01); *B32B 2457/204* (2013.01); *B32B 2457/206* (2013.01); *C09J 2203/318* (2013.01); *C09J 2400/123* (2013.01); *C09J 2400/143* (2013.01); *C09J 2400/263* (2013.01); *C09J 2401/006* (2013.01); *C09J 2433/00* (2013.01); *C09J 2463/00* (2013.01); *C09J 2467/006* (2013.01); *C09J 2475/00* (2013.01); *C09J 2479/08* (2013.01); *C09J 2483/00* (2013.01);

(Continued)

(58) Field of Classification Search
None
See application file for complete search history.

(56) References Cited

U.S. PATENT DOCUMENTS

2005/0129877 A1*  6/2005  Akada .................. C08J 5/043
                                                                  428/1.6
2006/0029784 A1*  2/2006  Doan et al. ................ 428/220

(Continued)

FOREIGN PATENT DOCUMENTS

| JP | 2008221507 A * | 9/2008 |
|---|---|---|
| KR | 10-0590425 | 6/2006 |
| KR | 10-2010-0001275 | 1/2010 |

*Primary Examiner* — Anthony J Frost
(74) *Attorney, Agent, or Firm* — H.C. Park & Associates, PLC

(57) ABSTRACT

Disclosed is display device including a display panel; a window disposed on the display panel; and an adhesive layer positioned between the display panel and the window, wherein the adhesive layer includes a polymer resin and a woven fiber.

12 Claims, 5 Drawing Sheets

(51) Int. Cl.
  *B32B 27/12*   (2006.01)
  *B32B 27/28*   (2006.01)
  *B32B 27/30*   (2006.01)
  *B32B 27/38*   (2006.01)
  *B32B 27/40*   (2006.01)
  *G02F 1/1333*  (2006.01)

(52) U.S. Cl.
  CPC ............ *G02F 2001/133331* (2013.01); *G02F 2202/28* (2013.01); *Y10T 428/24995* (2015.04)

(56) References Cited

U.S. PATENT DOCUMENTS

2010/0007942 A1* 1/2010 Oikawa et al. ............... 359/296
2010/0193961 A1* 8/2010 Konishi ................. C09J 7/0203
                                                     257/773

* cited by examiner

DISPLAY DEVICE

CROSS REFERENCE TO RELATED APPLICATION

This application claims priority from and the benefit of Korean Patent Application No. 10-2013-0081724 filed on Jul. 11, 2013 in the Korean Intellectual Property Office, which is hereby incorporated by reference for all purposes as if fully set forth herein.

BACKGROUND

Field

Exemplary embodiment of the present invention relate to a display device.

Discussion of the Background

The current display device market includes a good number of different forms of display devices; liquid crystal display (LCD), plasma display panel (PDP), organic light emitting diode display (OLED), field effect display (FED), electrophoretic display device, and the like.

Such display devices generally include a display module displaying an image and a window protecting the display module. The window is positioned at the outermost of a display to protect the display module, but it has limited ability in protecting the display module against external forces, such as pen pressure and the like.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a display device with additional protection to the display panel to prevent defects caused by an external force, such as pen pressure and the like.

Exemplary embodiments of the present invention further provides a display device including a display panel; a window; and an adhesive layer disposed between the display panel and the window, wherein the adhesive layer includes a polymer resin and a woven fiber. The woven fiber may be made of at least one of a glass fiber, a carbon fiber, a boron fiber, an aramid fiber, a polyester fiber, a ceramic fiber, asbestos, and a cellulose-based fiber. The adhesive layer may be formed by coating the polymer resin on both sides of the woven fiber. By disposing an adhesive layer reinforced with woven fiber right beneath the window, the adhesive layer may provide additional protection to a display panel against external force, such as a pen pressure and the like.

Additional features of the invention will be set forth in the description which follows, and in part will be apparent from the description, or may be learned by practice of the invention.

An exemplary embodiment of the present invention discloses a display device comprising; a display panel, a window disposed on the display panel, and an adhesive layer positioned between the display panel and the window, wherein the adhesive layer comprises; a polymer resin, and a woven fiber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
FIG. 1 is a cross-sectional view of a display device according to one embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the drawings, the thickness of layers, films, panels, regions, etc., are exaggerated for clarification purpose. It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A display device according to an exemplary embodiment of the present invention is described with reference to FIG. 1.

FIG. 1 is a cross-sectional view of a display device according to an exemplary embodiment.

Referring to FIG. 1, a display device 10 may include a display panel 12, a window is 16, and an adhesive layer 14 interposed between the display panel 12 and the window 16. The display panel 12 may be a liquid crystal display panel, an organic light emitting display panel, a plasma display panel (PDP), an electric field effect display panel, an electrophoresis display panel, and the like.

The adhesive layer 14 may include a polymer resin and a woven fiber. The adhesive layer may be in a form of an adhesive film. The adhesive layer according to an exemplary embodiment of the present invention may be described with reference to FIG. 2.

Figure 2:
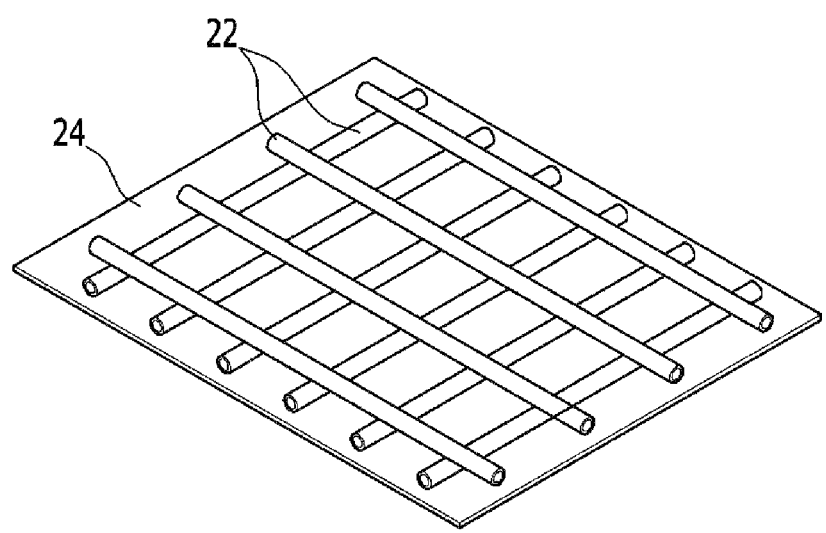
FIG. 2 is a schematic view of an adhesive layer according to one embodiment.

FIG. 2 is a schematic view of an adhesive layer according to an exemplary embodiment.

Referring to FIG. 2, the adhesive layer 20 may include a polymer resin 24 and a woven fiber 22. The polymer resin 24 may be an adhesive polymer resin. The woven fiber 22 may be a transparent fiber, which may provide extra hardness to the structure. Thus, the adhesive layer 20 including the polymer resin 24 and the transparent woven fiber 22 may be configured to be transparent, flexible, and adhesive, but also at the same time, may be configured to have extra hardness. Referring to FIG. 1, by disposing the adhesive layer 20 right beneath the window 16 as an adhesive layer 14 between the display panel 12 and the window 16, the adhesive layer 20 may provide additional support for the display panel and the window with extra hardness, preventing physical deformation by protecting the display device from external force, such as a pen pressure and the like.

The adhesive layer 20 may be formed by coating the polymer resin 24 on both sides of the woven fiber 22.

The woven fiber 22 may be made of at least one of, but not limited to; a glass fiber, a carbon fiber, a boron fiber, an aramid fiber, a polyester fiber, a ceramic fiber, an asbestos, and a cellulose-based fiber. The polymer resin may be made of at least one of, but not limited to, an acryl-based resin, an epoxy-based resin, a urethane-based resin, a silicon-based resin, and an imide-based resin.

The woven fiber 22 may have a refractive index of about 1.40 to about 1.70. The polymer resin 24 may have a refractive index of about 1.40 to about 1.70. In an exemplary embodiment of the adhesive layer 20, the polymer resin 24 and the woven fiber 22 may have an identical refractive index. The refractive index of the polymer resin 24 and the woven fiber may be made equal by, but not limited to, changing the structure of the polymer resin, or adding an additive thereto. The transparency and flexibility of the adhesive layer 20 may be further increased by matching the refractive indexes of the woven fiber 22 and the polymer resin 24.

The hardness of the adhesive layer 20 may be adjusted by changing the diameter of the woven fiber 22. The diameter of the woven fiber 22 may be determined by the number of fiber strands constituting the fiber. In other words, the diameter of the woven fiber 22 increases when more fiber strands are used to constitute each fiber.

In an exemplary embodiment, the woven fiber 22 may have an average diameter of about 10 to about 90 um, more specifically about 20 to about 80 um.

The adhesive layer 20 may include a single layer or multiple layers of woven fiber 22. The extra hardness of the adhesive layer 20 may be further increased when multiple layers of woven fiber 22 are disposed within the adhesive layer 20.

In one exemplary embodiment, the woven fiber 22 may constitute about 20 to about 90 wt %, specifically about 30 to about 80 wt %, and more specifically about 50 to about 80 wt % of the adhesive layer 20. In the present embodiment of the invention, the adhesive layer 20 may have enhanced tensile strength, tensile modulus, and shear elastic modulus as well as increased hardness. When the adhesive layer 20 is applied to a display device, the adhesive layer 20 may provide additional protection to the display panel and prevent physical deformation of a window 16 caused by an external force such as pen pressure and the like.

The polymer resin 24 may provide adhesive strength to at least one side of the woven fiber 22. The adhesive polymer resin may bond the adhesive layer to the display panel and the window 16 providing enhanced protection against external force.

The structure of the polymer resin according to three exemplary embodiments of the present invention may be illustrated with reference to FIGS. 3 to 5.

Figure 3:
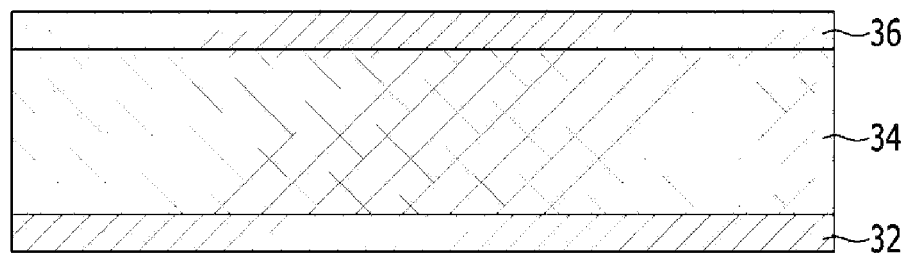
FIG. 3 is a cross-sectional view of an adhesive layer according to an exemplary embodiment.

FIG. 3 is a cross-sectional view showing an adhesive layer according to an exemplary embodiment.

Referring to FIG. 3, the exemplary embodiment of adhesion layer 30 may include a woven fiber 34 and a polymer resin. The polymer resin may include a first resin 32 and a second resin 36, wherein the first resin 32 is disposed on the lower surface of the woven fiber 34 and the second resin 36 is disposed on the upper surface of the woven fiber 34. In current exemplary embodiment of the invention, the first resin 32 and the second resin 36 may have the same adhesive strength. In other words, the adhesive layer 30 will bond with the display panel 12 and the window 16 with identical bonding strength, through the first resin 32 and the second resin 36, respectively.

Figure 4:
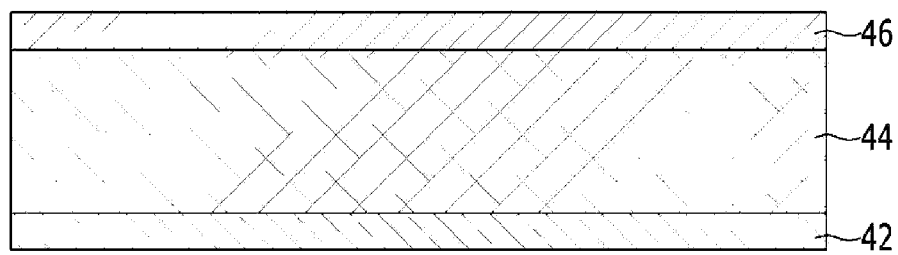
FIG. 4 is a cross-sectional view of an adhesive layer according to an exemplary embodiment.

FIG. 4 is a cross-sectional view showing an adhesive layer according to an exemplary embodiment.

Referring to FIG. 4, the exemplary embodiment of adhesive layer 40 may include a woven fiber 44 and a polymer resin. The polymer resin may include a first resin 42 and a second resin 46, wherein the first resin 42 is disposed on the lower surface of the woven fiber 44 and the second resin 46 is disposed on the upper surface of the woven fiber 44. In current exemplary embodiment of the invention, the first resin 42 may have greater adhesive strength than the second resin 46. In other words, the adhesive layer 40 may have stronger bond with the display panel 12 than the window 16, respectively bonding with the first resin 42 and the second resin 46.

Figure 5:
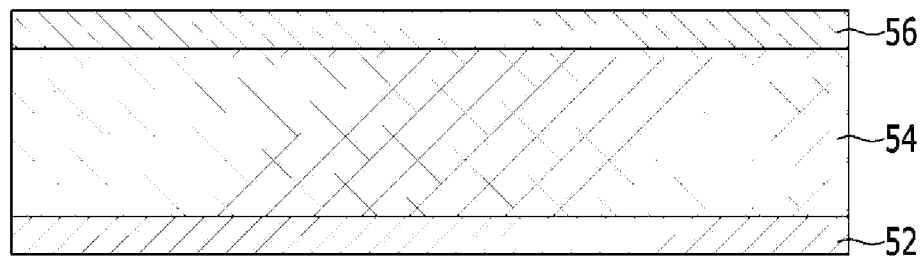
FIG. 5 is a cross-sectional view of an adhesive layer according to an exemplary embodiment.

FIG. 5 is a cross-sectional view showing an adhesive layer according to an exemplary embodiment.

Referring to FIG. 5, the exemplary embodiment of adhesive layer 50 may include a woven fiber 54 and a polymer resin. The polymer resin may include a first resin 52 and a second resin 56, wherein the first resin 52 is disposed on the lower surface of the woven fiber 54 and the second resin 56 is disposed on the upper surface of the woven fiber 54. In current exemplary embodiment of the invention, the second resin 56 may have greater adhesive strength than the first resin 52. In other words, the adhesive layer 50 may have stronger bond with the window 16 than the display panel 12, respectively bonding with the second resin 56 and the first resin 52.

Referring to FIGS. 1 to 5, the adhesive layer may have a tensile strength of about 0.0001 to about 100 MPa, specifically about 0.001 to about 1 MPa, and more specifically about 0.001 to about 0.1 MPa. The tensile strength indicates tensile stress at a yield point.

The adhesive layer may have a tensile modulus of about 0.001 to about 1 GPa, specifically about 0.001 to about 100 MPa, and more specifically about 0.001 to about 1 MPa.

The adhesive layer may have a shear modulus of about 100 to about 1500 MPa, specifically about 100 to about 1200 MPa, and more specifically about 100 to about 1000 MPa.

The adhesive layer of the exemplary embodiments is strong and flexible in nature. Therefore, not only it may provide additional protection to a display panel to prevent defects caused by an external force, such as a pen pressure and the like, but also it could be used for flexible display devices such as foldable display devices.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display panel;
    a window disposed on the display panel; and
    an adhesive layer disposed between the display panel and the window,
    wherein the adhesive layer comprises a polymer resin and a woven fiber,
    wherein the polymer resin comprises a first resin disposed directly on a lower surface of the woven fiber and a second resin disposed directly on an upper surface of the woven fiber,
    wherein the adhesive layer has a tensile modulus of about 0.001 to about 1 GPa.

2. The display device of claim 1, wherein the woven fiber comprises at least one of a glass fiber, a carbon fiber, a boron fiber, an aramid fiber, a polyester fiber, a ceramic fiber, asbestos, and a cellulose-based fiber.

3. The display device of claim 1, wherein the woven fiber has a refractive index of about 1.4 to about 1.7.

4. The display device of claim 1, wherein the woven fiber has an average diameter of about 10 to about 90 um.

5. The display device of claim 1, wherein the adhesive layer further comprises multiple layers of woven fibers.

6. The display device of claim 1, wherein the woven fiber constitutes about 20 to about 90 wt % of the adhesive layer.

7. The display device of claim 1, wherein the polymer resin comprises at least one of an acryl-based resin, an epoxy-based resin, a urethane-based resin, a silicon-based resin, and an imide-based resin.

8. The display device of claim 1, wherein the polymer resin has a refractive index of about 1.4 to about 1.7.

9. The display device of claim 1, wherein the first resin and the second resin have the same adhesive strength.

10. The display device of claim 1, wherein the first resin and the second resin have different adhesive strengths from each other.

11. The display device of claim 1, wherein the adhesive layer has shear modulus of about 100 to about 1500 MPa.

12. The display device of claim 1, wherein the display device is a liquid crystal display (LCD), an organic light emitting diode (OLED) display, a plasma display, an electric field effect display device, or an electrophoresis display device.

* * * * *